United States Patent
Chao et al.

(10) Patent No.: US 10,172,208 B1
(45) Date of Patent: Jan. 1, 2019

(54) METHOD FOR ADJUSTING COLOR TEMPERATURE OF LED IN SINGLE LIGHT FIXTURE

(71) Applicant: ZhongShan Luxmode Industrial Co., LTD, Zhongshan, Guangdong (CN)

(72) Inventors: Wei-Lun Chao, Zhongshan (CN); Yung Lung Cheng, Zhongshan (CN)

(73) Assignee: ZHONGSHAN LUXMODE INDUSTRIAL CO., LTD., Zhongshan, Guangdong (CN)

( * ) Notice: Subject to any disclaimer, the term of this patent is extended or adjusted under 35 U.S.C. 154(b) by 0 days.

(21) Appl. No.: 15/980,000

(22) Filed: May 15, 2018

(30) Foreign Application Priority Data

Nov. 16, 2017 (CN) ...................... 2017 2 1538862 U

(51) Int. Cl.
| | |
|---|---|
| H05B 37/02 | (2006.01) |
| H05B 33/08 | (2006.01) |
| F21V 23/04 | (2006.01) |
| F21V 17/16 | (2006.01) |
| F21V 1/00 | (2006.01) |
| F21Y 105/10 | (2016.01) |
| F21Y 115/10 | (2016.01) |

(52) U.S. Cl.
CPC ............. *H05B 33/086* (2013.01); *F21V 1/00* (2013.01); *F21V 17/162* (2013.01); *F21V 23/04* (2013.01); *H05B 33/0827* (2013.01); *F21Y 2105/10* (2016.08); *F21Y 2115/10* (2016.08)

(58) Field of Classification Search
CPC ............ H05B 33/0803; H05B 33/0827; H05B 33/0809; H05B 33/0821; H05B 41/34; H05B 39/09; H05B 41/28; H05B 41/295; H05B 41/2827; H05B 41/3925; F21Y 2101/02; Y02B 20/202; H01J 19/36; H01J 2893/0027; H01J 7/24; H01J 61/523; H01J 61/52; H01J 65/044; H04B 1/036; F21K 9/00; F21V 29/004
See application file for complete search history.

(56) References Cited

U.S. PATENT DOCUMENTS

| | | | |
|---|---|---|---|
| 2013/0147361 A1* | 6/2013 | Kang | H05B 33/089 315/122 |
| 2014/0210361 A1* | 7/2014 | Ferrier | H05B 33/0812 315/186 |
| 2015/0022073 A1* | 1/2015 | Moon | F21K 9/1355 313/11 |
| 2017/0064785 A1* | 3/2017 | Kim | H05B 33/086 |
| 2017/0290111 A1* | 10/2017 | Akiyama | H05B 37/02 |
| 2017/0318643 A1* | 11/2017 | Qiu | H05B 33/0827 |

* cited by examiner

*Primary Examiner* — Minh D A
(74) *Attorney, Agent, or Firm* — Muncy, Geissler, Olds & Lowe, P.C.

(57) ABSTRACT

Disclosed in the present invention is a method for adjusting a color temperature of an LED in a single light fixture. In the method, at least two light-emitting modules in a single light fixture are respectively electrically connected to a switch, each light-emitting module is independently adjusted by a switch corresponding to the light-emitting module, and the light-emitting modules have different color temperatures. Therefore, the brightness of each light-emitting module can be respectively controlled by using each switch, so that emitted light of the single light fixture has more than three color temperatures.

8 Claims, 2 Drawing Sheets

METHOD FOR ADJUSTING COLOR TEMPERATURE OF LED IN SINGLE LIGHT FIXTURE

BACKGROUND OF THE INVENTION

1. Field of the Invention

The present invention relates to a method for controlling an LED module, and in particular, to a method for adjusting a color temperature of an LED in a single light fixture.

2. Description of the Related Art

For a conventional lighting fixture, a power supply is electrically connected to a single-unit light source, and a lighting effect is achieved through electrical conduction between the power supply and the single-unit light source. However, inmost scenarios, different colour temperatures need to be used for application to different application scenarios. For a home, warm light is usually used for lighting to provide a warm and sweet atmosphere. Natural light or true white light is usually used during reading to provide sufficient brightness to help people concentrate and therefore improve the reading experience. In an existing lighting fixture, a remote control is usually used to control and adjust a colour temperature. However, the remote control requires relatively high costs and has relatively unstable adjustment.

SUMMARY OF THE INVENTION

To resolve the foregoing technical problem, the objective of the present invention is to provide a method for adjusting a color temperature of an LED in a single light fixture, which can effectively reduce the costs of producing an LED module having an adjustable color temperature.

To achieve the foregoing objective, the present invention provides a method for adjusting a color temperature of an LED in a single light fixture, including the following steps: providing a light fixture, including at least two light-emitting modules, wherein the light-emitting modules respectively have a loop and a color temperature, are respectively controlled by different switches, and have different color temperatures; and the switch element is selectively turned on or off, and the brightness of the corresponding light-emitting modules can be controlled, so that light emitted by the light fixture at least has more than three different color temperatures.

In an embodiment of the present invention, two light-emitting modules, namely, a first light-emitting module and a second light-emitting module are provided; and the switch element includes a first switch, electrically connected to the first light-emitting module, and a second switch, electrically connected to the second light-emitting module.

Furthermore, the switch element further includes a first MOS transistor, a second MOS transistor, a first resistor, a second resistor, a third resistor, and a fourth resistor, wherein a drain of the first MOS transistor is electrically connected to the first light-emitting module, a source of the first MOS transistor is electrically connected to one end of the third resistor, one end of the first resistor is respectively electrically connected to the other end of the third resistor and a gate of the first MOS transistor, the other end of the first resistor is electrically connected to the first switch, a drain of the second MOS transistor is electrically connected to the second light-emitting module, a source of the second MOS transistor is electrically connected to one end of the fourth resistor, one end of the second resistor is respectively electrically connected to the other end of the fourth resistor and a gate of the second MOS transistor, and the other end of the second resistor is electrically connected to the second switch.

By means of the method for adjusting a color temperature of an LED in a single light fixture disclosed in the present invention, when a fixed color temperature of the first light-emitting module is a first color temperature and a fixed color temperature of the second light-emitting module is a second color temperature, by controlling the first switch and the second switch, a color temperature of emitted light of the light fixture can be the first color temperature, the second color temperature, or an average value of the first color temperature and the second color temperature.

Specifically, when the first switch is turned on and the second switch is turned off, a color temperature of light emitted by the light fixture is the first color temperature; when the first switch is turned off and the second switch is turned on, a color temperature of light emitted by the light fixture is the second color temperature; and when the first switch and the second switch are both turned on, a color temperature of light emitted by the light fixture is an average value of the first color temperature and the second color temperature.

In an embodiment of the present invention, the light fixture further includes a substrate, for arranging the light-emitting modules, and the switch element, arranged on the substrate and including the switches of which a number is equal to a number of the light-emitting modules.

To improve operation convenience of the light fixture, the light fixture further includes a driving power source, arranged on the substrate, and connected to and driving the light-emitting modules to emit light.

To enhance the beauty and safety of the light fixture, the light fixture further includes a shade, correspondingly buckled on the substrate, the light-emitting modules are arranged between the substrate and the shade, and the shade may be an acrylic shade, a plastic shade, a cloth shade, a glass shade, a metal shade or a transparent dolomite shade.

To improve the assembly convenience, the light fixture further includes a mounting board, used for arranging the substrate, where the mounting board further includes a mounting portion for mounting the shade.

BRIEF DESCRIPTION OF THE DRAWINGS

Specific implementation manners of the present invention are further described below with reference to the accompanying drawings.

DETAILED DESCRIPTION OF THE PREFERRED EMBODIMENTS

The present invention discloses a method for adjusting a color temperature of an LED in a single light fixture. By means of the method, light-emitting modules having different color temperatures in a light fixture can be independently controlled by switches. Specifically, the light fixture has at least two light-emitting modules, each light-emitting module is electrically connected to a switch and can be independently adjusted by a switch corresponding to the light-emitting module, and the brightness of each light-emitting module can be respectively controlled by using each switch, so that emitted light of the light fixture has more than three color temperatures.

Figure 1:
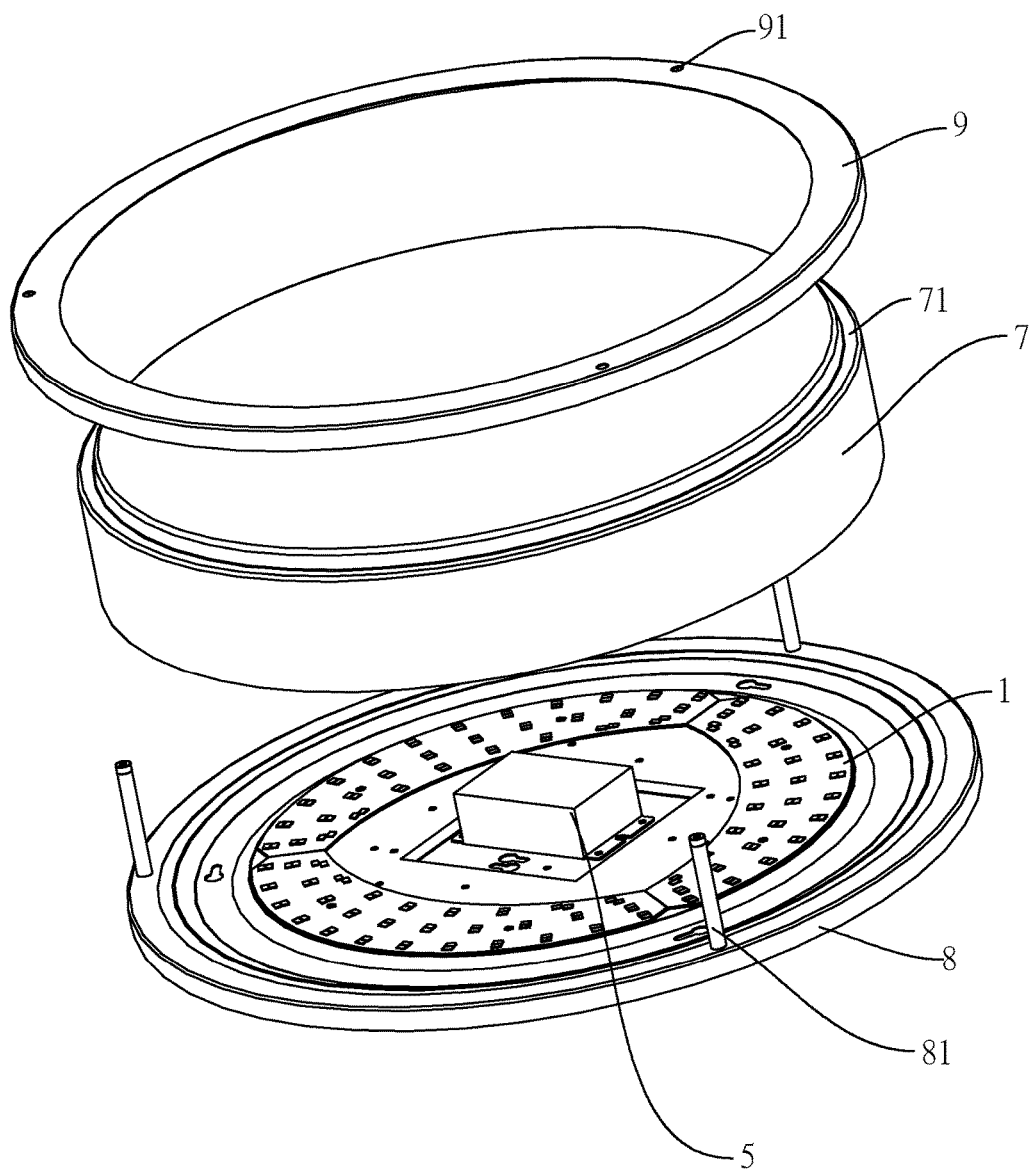
FIG. 1 is a three-dimensional exploded view according to the present invention.
Figure 2:
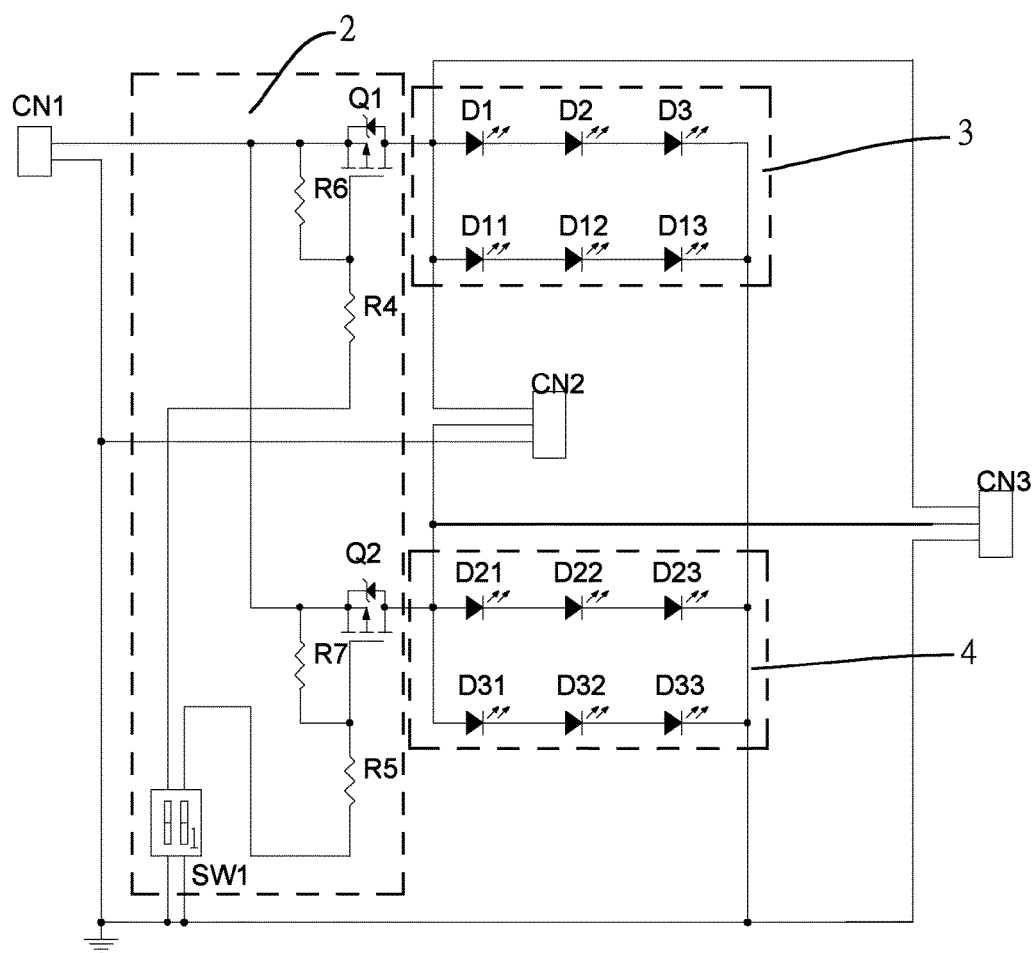
FIG. 2 is a circuit principle diagram according to the present invention.

Referring to FIG. 1 and FIG. 2, a method for adjusting a color temperature of an LED in a single light fixture in an embodiment of the present invention is used for providing emitted light of a light fixture with three varied color temperatures, wherein the light fixture includes a substrate (1), a switch element (2), a first light-emitting module (3), and a second light-emitting module (4).

The switch element (2) is arranged on the substrate (1), and includes a first switch (SW1), a second switch (SW2), a first MOS transistor (Q1), a second MOS transistor (Q2), a first resistor (R4), a second resistor (R5), a third resistor (R6), and a fourth resistor (R7).

The first light-emitting module (3) and the second light-emitting module (4) are respectively formed by several light-emitting diodes connected in series and/or in parallel, and are arranged on the substrate (1). The first light-emitting module (3) and the second light-emitting module (4) are respectively electrically connected to the first switch (SW1) and the second switch (SW2).

Furthermore, a drain of the first MOS transistor (Q1) is electrically connected to the first light-emitting module (3), a source of the first MOS transistor (Q1) is electrically connected to one end of the third resistor (R6), one end of the first resistor (R4) is respectively electrically connected to the other end of the third resistor (R6) and a gate of the first MOS transistor (Q1), the other end of the first resistor (R4) is electrically connected to the first switch (SW1), a drain of the second MOS transistor (Q2) is electrically connected to the second light-emitting module (4), a source of the second MOS transistor (Q2) is electrically connected to one end of the fourth resistor (R7), one end of the second resistor (R5) is respectively electrically connected to the other end of the fourth resistor (R7) and a gate of the second MOS transistor (Q2), and the other end of the second resistor (R5) is electrically connected to the second switch (SW2).

By means of the method of the present invention, the effect of adjusting a color temperature of a single light fixture can be achieved by using fewer components, so as to achieve the effects of reducing the costs and improving the practicability. For example, a fixed color temperature of the first light-emitting module (3) is 3000 K, and a fixed color temperature of the second light-emitting module (4) is 4000 K. The color temperatures are between warm white light and natural white light, and are suitable for use in places such as homes and hotels, and users feel comfortable in terms of visual perception. When the first switch (SW1) is used to control the first MOS transistor (Q1) to be turned on, the first light-emitting module (3) emits emitted light whose color temperature is 3000 K. When the second switch (SW2) is used to control the second MOS transistor (Q2) to be turned on, the second light-emitting module (4) emits emitted light whose color temperature is 4000 K. When the first switch (SW1) and the second switch (SW2) are used to control the first MOS transistor (Q1) and the second MOS transistor (Q2) to be turned on, the first light-emitting module (3) and the second light-emitting module (4) both emit emitted light to obtain emitted light whose color temperature is 3500 K.

The fixed color temperatures of the first light-emitting module (3) and the second light-emitting module (4) are preferred color temperatures. The present invention includes, but is not limited to, the preferred color temperatures.

In addition, a third light-emitting module may further be added in the present invention. A color temperature of the third light-emitting module is preferably 6000 K. The third light-emitting module is used in combination with the switch element (2), to improve the variety of a color temperature.

Further, a driving power source (5) connected to and driving an LED light-emitting component to emit light is further arranged on the substrate (1).

The light fixture disclosed in the present invention further includes:

a shade (7), buckled on the substrate (1), an LED light-emitting component facing the shade (7); and a mounting board (8), the substrate (1) being arranged on the mounting board (8), and a mounting portion being further arranged on the mounting board (8) for fixedly mounting the shade (7).

The mounting portion includes a fixing ring (9) and several positioning columns (81) arranged on a mounting base plate (8). A flange (71) is arranged on the circumference of the shade (7), and the fixing ring (9) is sleeved on the flange (71) for fixing the shade (7) on the mounting base plate (8). A positioning hole (91) matching the positioning column (81) is arranged on the fixing ring (9). The foregoing mounting structure is relatively simple and practical, so that unnecessary structures and steps in the prior art are reduced, thereby improving the practicability of a product.

The shade (7) is arranged to be an acrylic shade, a plastic shade, a cloth shade, a glass shade, a metal shade or a transparent dolomite shade, so as to improve the transmittance of a product and make the product more beautiful.

The foregoing is merely preferred implementation manners of the present invention, but the present invention is not limited to the foregoing implementation manner. All technical solutions that achieve the objective of the present invention by using basically the same measure fall within the protection scope of the present invention.

What is claimed is:

1. A method for adjusting a color temperature of an LED in a single light fixture, comprising providing a light fixture which includes at least two light-emitting modules, wherein the light-emitting modules respectively have a loop and a color temperature, are respectively controlled by different switches, and have different color temperatures;

the switch element is selectively turned on or off, and the brightness of the corresponding light-emitting modules can be controlled, so that light emitted by the light fixture at least has more than three different color temperatures;

a number of the light-emitting modules is two for a first light-emitting module and a second light-emitting module; and the switch element includes a first switch, electrically connected to the first light-emitting module, a second switch, electrically connected to the second light-emitting module, a first MOS transistor, a second MOS transistor, a first resistor, a second resistor, a third resistor, and a fourth resistor, wherein:

a drain of the first MOS transistor is electrically connected to the first light-emitting module;

a source of the first MOS transistor is electrically connected to one end of the third resistor;

one end of the first resistor is respectively electrically connected to the other end of the third resistor and a gate of the first MOS transistor;

the other end of the first resistor is electrically connected to the first switch;

a drain of the second MOS transistor is electrically connected to the second light-emitting module;

a source of the second MOS transistor is electrically connected to one end of the fourth resistor;

one end of the second resistor is respectively electrically connected to the other end of the fourth resistor and a gate of the second MOS transistor; and the other end of the second resistor is electrically connected to the second switch.

2. The method for adjusting a color temperature of an LED in a single light fixture according to claim 1, wherein the light fixture further includes a substrate, for arranging the light-emitting modules, and the switch element, arranged on the substrate and including the switches of which a number is equal to a number of the light-emitting modules.

3. The method for adjusting a color temperature of an LED in a single light fixture according to claim 2, wherein a driving power source, arranged on the substrate, connects to and drives the light-emitting modules to emit light.

4. The method for adjusting a color temperature of an LED in a single light fixture according to claim 2, wherein the light fixture further includes a shade, correspondingly buckled on the substrate, and the light-emitting modules are arranged between the substrate and the shade.

5. The method for adjusting a color temperature of an LED in a single light fixture according to claim 4, wherein the light fixture further includes a mounting board, used for arranging the substrate.

6. The method for adjusting a color temperature of an LED in a single light fixture according to claim 4, wherein the mounting board further includes a mounting portion for mounting the shade.

7. The method for adjusting a color temperature of an LED in a single light fixture according to claim 4, wherein the shade is selected from the group consisting of an acrylic shade, a plastic shade, a cloth shade, a glass shade, a metal shade and a transparent dolomite shade.

8. The method for adjusting a color temperature of an LED in a single light fixture according to claim 1, wherein a fixed color temperature of the first light-emitting module is a first color temperature and a fixed color temperature of the second light-emitting module is a second color temperature, and when the first switch is turned on and the second switch is turned off, a color temperature of light emitted by the light fixture is the first color temperature; when the first switch is turned off and the second switch is turned on, a color temperature of light emitted by the light fixture is the second color temperature; and when the first switch and the second switch are both turned on, a color temperature of light emitted by the light fixture is an average value of the first color temperature and the second color temperature.

\* \* \* \* \*